UNITED STATES PATENT OFFICE.

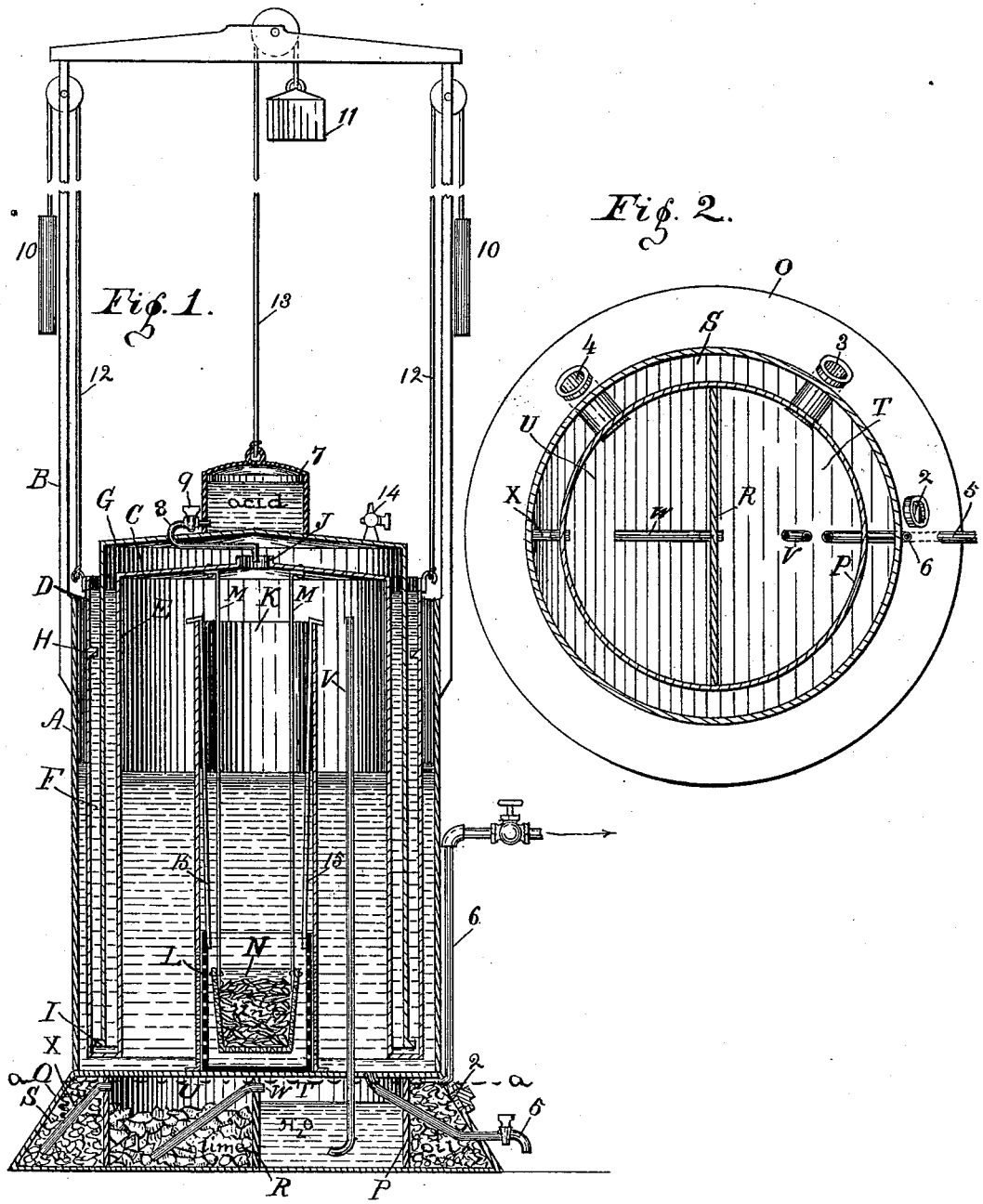

HENRY WALKER NEAL AND HARRY W. NEAL, OF INDIANAPOLIS, INDIANA, ASSIGNORS TO ALBERT F. KOPP, JULIUS A. SCHULLER, AND HENRY R. POMEROY, OF SAME PLACE.

HYDROGEN-GAS MACHINE.

SPECIFICATION forming part of Letters Patent No. 536,758, dated April 2, 1895.

Application filed June 25, 1894. Renewed February 15, 1895. Serial No. 538,486. (No model.)

*To all whom it may concern:*

Be it known that we, HENRY WALKER NEAL and HARRY W. NEAL, citizens of the United States, residing at Indianapolis, in the county of Marion and State of Indiana, have invented a new and useful Improvement in Hydrogen-Gas Machines, of which the following is a specification.

Our invention relates to an improved portable machine for making an illuminating gas, of which hydrogen-gas forms the principal portion.

The objects of our improvement are, to provide means for producing hydrogen-gas by the decomposition of acidulated water and iron chips; a gas-holder of large capacity; means for automatically stopping the production of gas when the limit of the holding capacity of the gas-holder has been reached; means for conveniently saving and removing the resultant of the decomposition, and means for washing, drying, and carbureting the hydrogen-gas when formed, all compactly arranged as hereinafter fully set forth.

The accompanying drawings illustrate our invention.

Figure 1 represents a central vertical section of the apparatus. Fig. 2 represents a plan at —a— Fig. 1.

In the drawings, A, indicates an open cylindrical tank, having, secured at opposite sides, a frame, B, from which the gas-holder is suspended. The gas-holder consists of a cylindrical vessel, C, having double walls, D, and E, which form an annular space, F, which is closed at the bottom and open at the top, the interior space between the inner walls being closed at the top and open at the bottom, as shown; and a second cylindrical vessel, G, which is closed at the top and open at the bottom and is suspended within the annular space F, said space being filled with water to form a water-sealed joint between the two vessels which form, when together, a telescoping gas-holder.

Vessels C, and G, are provided with opposed interlocking flanges, H, and I, which prevent their separation when extended. Vessel C is provided in the center of its top with a central opening, J, through which communication is established between the interiors of vessels C and G.

Erected upon the bottom of tank A, and concentric with the walls thereof, is the circular partition, K, the lower part of which is perforated. Mounted within cylinder K so as to slide easily therein is a cylindrical bucket, L, the walls of which are also perforated. Suspended from the top of vessel C, within cylinder K and concentric therewith, by means of straps, M, M, is a bucket, N, having perforated walls; the arrangement being such that when the gas-holder is empty said bucket N is suspended within the bucket L.

Tank A with its contents is mounted upon a hollow base, O, which is divided by means of a circular partition, P, and a diametrical partition, R, into three chambers, S, T, and U. Chamber S is annular in shape and extends around the entire periphery of the base. Chambers T and U are semi-circular in shape, and occupy the space within the circular partition. Communication is established between the interior of the gas-holder and compartment T, by means of the pipe V, which extends from a point near the top of tank A to the lower part of chamber T. Communication is established between chambers T and U by means of a pipe, W, which extends from a point near the top of chamber T to a point near the bottom of chamber U. Communication is established between chambers U and S by means of a pipe, X, which extends from a point near the top of chamber U downward into the chamber S. Access is had to the interiors of chambers S, T, and U respectively, through openings 2, 3, and 4, which are closed by suitable covers. A drainage pipe, 5, extends from the bottom of tank A through the side of the base, and a gas discharge pipe, 6, extends upward from the upper part of chamber S. Mounted upon the top of vessel G, is a pure acid tank, 7, which is provided with a discharge pipe 8, having a suitable stop-cock, 9, and is arranged to discharge the contents of tank 7 through the central opening in the top of vessel C.

Vessels C and G are counter-balanced to any desired extent, by means of weights 10, and 11, which are attached to the respective vessels by means of cords, 12, and 13, which pass over suitable guide pulleys mounted on the frame B. Vessel C is provided with a pet-cock, 14.

The operation of our apparatus is as follows: Chamber S is filled with wood-fiber, or other suitable absorbent, which is then saturated with gasoline, or some other light hydrocarbon. Chamber U is partly filled with unslaked lime; and the chamber T is partly filled with clean water. Tank A is now partly filled with dilute sulfuric acid. Vessel C, carrying the bucket N charged with iron chips, or iron ore, is now lowered into tank A, thus submerging the bucket and its contents in the acidulated water at the bottom of cylinder K. Vessel G is now lowered into the annular space F, in vessel C, and said space is then filled with water, thus making a sealed joint between the two vessels. Hydrogen-gas being formed by the action of the acid upon the iron it rises through opening J, thus filling and raising vessel G until flanges H and I engage each other and the further production of gas operates to raise vessel C until the bucket, M, is lifted above the surface of the acid, when the production of gas ceases. The discharge pipe 6 being opened the gas passes from the interior of the gas-holder through pipe V into compartment T, where it is washed by passing through the water contained therein, and then passes from compartment T through pipe W where it is discharged into compartment U through the lime contained therein. Then, passing through pipe X into chamber S, is brought in contact with the hydrocarbon contained therein, and, being thus carbureted, is discharged through pipe 6. If desired, the lime may be placed in compartment T and the water in compartment U. The residuum, resulting from the decomposition of the material used to form the hydrogen-gas, collects within the bucket L and may be conveniently removed by lifting said bucket out of the cylinder K; suitable hooks or straps, 15 being attached to the bucket for that purpose. When the action of the acidulated water becomes weakened the solution may be strengthened by opening cock 9 and allowing a portion of the pure acid contained in tank 7 to be discharged into cylinder K. When the gas has become partially exhausted in the holder, the holder falls and the iron chips contained in bucket N are again submerged in the acidulated water and the production of gas is resumed.

We claim as our invention—

In a gas-machine, the combination of the tank for holding acidulated water, the circular partition arranged concentrically in said tank, the gas-holder suspended in said tank, the bucket suspended from said gas-holder within said cylinder, and the bucket removably mounted in said cylinder and arranged to receive the products of decomposition of the materials for producing the gas, all substantially as set forth.

HENRY WALKER NEAL.
HARRY W. NEAL.

Witnesses:
H. P. HOOD,
V. M. HOOD.